(12) United States Patent
Catalfamo

(10) Patent No.: US 8,440,318 B2
(45) Date of Patent: May 14, 2013

(54) WATER-SOLUBLE SUBSTRATE WITH RESISTANCE TO DISSOLUTION PRIOR TO BEING IMMERSED IN WATER

(75) Inventor: Vincenzo Catalfamo, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 997 days.

(21) Appl. No.: 11/824,717

(22) Filed: Jul. 2, 2007

(65) Prior Publication Data

US 2008/0009584 A1  Jan. 10, 2008

Related U.S. Application Data

(60) Provisional application No. 60/818,689, filed on Jul. 5, 2006.

(51) Int. Cl.
*B32B 27/34* (2006.01)
*B32B 27/00* (2006.01)
*B32B 23/04* (2006.01)

(52) U.S. Cl.
USPC .................... 428/500; 428/47.4; 428/532

(58) Field of Classification Search .......... None
See application file for complete search history.

(56) References Cited

U.S. PATENT DOCUMENTS

| | | | |
|---|---|---|---|
| 4,725,465 A * | 2/1988 | Lastovich | 428/34.3 |
| 6,509,072 B2 | 1/2003 | Bening et al. | |
| 6,670,314 B2 | 12/2003 | Smith et al. | |
| 6,773,465 B1 | 8/2004 | Murai et al. | |
| 2002/0169092 A1 | 11/2002 | Alexandre et al. | |
| 2003/0008085 A1 * | 1/2003 | Davenet et al. | 428/35.4 |
| 2004/0033379 A1 | 2/2004 | Grunlan et al. | |
| 2004/0121339 A1 | 6/2004 | Zhou et al. | |
| 2004/0191504 A1 | 9/2004 | Stevenson et al. | |
| 2008/0008859 A1 | 1/2008 | Catalfamo | |
| 2008/0008872 A1 | 1/2008 | Catalfamo | |
| 2008/0008873 A1 | 1/2008 | Catalfamo | |
| 2008/0008889 A1 | 1/2008 | Catalfamo | |
| 2008/0008906 A1 | 1/2008 | Catalfamo | |
| 2008/0009585 A1 | 1/2008 | Catalfamo | |
| 2008/0010754 A1 | 1/2008 | Catalfamo | |
| 2008/0041751 A1 | 2/2008 | Catalfamo | |

FOREIGN PATENT DOCUMENTS

| | | |
|---|---|---|
| WO | WO 00/49072 A | 8/2000 |
| WO | WO 01/023460 | 4/2001 |
| WO | WO 02/072674 A | 9/2002 |
| WO | WO 03/058300 A | 7/2003 |
| WO | WO 2004/004929 A | 1/2004 |

OTHER PUBLICATIONS

XP002458037 Database WPI week 200139; Derwent Publications Ltd.; London; GB; AN 2001-374249.
International Search report—6 Pages.

* cited by examiner

*Primary Examiner* — Sheeba Ahmed
(74) *Attorney, Agent, or Firm* — Tiffany M. Zerby; Steven W. Miller

(57) ABSTRACT

A water-soluble substrate, and more particularly a water-soluble substrate that is resistant to dissolution, and methods of making the same are disclosed. The water-soluble substrate comprises a first surface and a second surface. A coating is applied to, and substantially covers at least one of said first and second surfaces. The elongation ratio between said coating and said water-soluble substrate is at least 1. Articles, such as pouches, made from the water-soluble substrate, are also disclosed herein.

6 Claims, 2 Drawing Sheets

WATER-SOLUBLE SUBSTRATE WITH RESISTANCE TO DISSOLUTION PRIOR TO BEING IMMERSED IN WATER

CROSS REFERENCE TO RELATED APPLICATION

This application claims the benefit of U.S. Provisional Application Ser. No. 60/818,689, filed Jul. 5, 2006, the disclosure of which is incorporated by reference.

FIELD OF THE INVENTION

This invention relates to a water-soluble substrate, and more particularly a water-soluble substrate which has improved resistance to dissolution prior to being immersed in water, and methods of making the same. This invention also relates to articles, such as pouches, made from the water-soluble substrate.

BACKGROUND OF THE INVENTION

Water-soluble substrates are gaining wider acceptance for use as packaging materials. Packaging materials include films, sheets, blown or molded hollow bodies (i.e. sachets, pouches, and tablets), bottles, receptacles and the like. Often, water-soluble substrates, when used in the preparation of certain types of these articles such as sachets and pouches, disintegrate and/or become sticky when exposed to small amounts of water or high humidity. This can make them unsuitable for usage in the packaging and storage of the compositions contained therein.

The most common consumer complaint for water-soluble pouches is linked to unwanted pouch dissolution when accidentally exposed to small amounts of water, such as when water gets inside the outer packaging in which the pouches are sold and stored after purchase, from wet hands, high humidity, leaking sinks, or pipes during storage. This may cause the water-soluble pouches to leak prior to use and/or stick together. The second most frequent complaint is that of the water-soluble pouch failing to fully dissolve upon use. Thus, there remains an unmet need for water-soluble substrates and articles made therefrom, such as sachets and pouches, which has improved resistance against exposure to small amounts of water yet can subsequently dissolve very quickly when immersed in an aqueous solution, such as rinse and/or wash water. Various methods are known in the art to retard the dissolution of water-soluble substrates, typically involving coating the water-soluble substrate with a material which is water-insoluble. For example, U.S. Pat. No. 6,509,072 describes a water-soluble substrate comprising a barrier coating. The barrier coating is a polymeric film which forms a continuous film on the water-soluble substrate. Another example of a barrier coating is described in WO 01/23460, assigned to Kao Corporation, wherein a surface of the water-soluble substrate is coated with a particulate or fibrous water-insoluble material When these coated water-soluble substrates are processed for use as packaging materials, they are typically being stretched. In certain areas, the substrate may be stretched even up to 200% or more. This could cause the coating to break, and thus allow water to contact the surface of the water-soluble substrate, leading to the above mentioned problems.

It is therefore an aspect of the present invention to provide water-soluble substrates which have improved resistance to dissolution prior to being immersed in water, even when these substrates have been stretched and formed into articles such as pouches and sachets, yet can subsequently dissolve very quickly when immersed in an aqueous solution, such as rinse and/or wash water.

SUMMARY OF THE INVENTION

The present invention relates to a water-soluble substrate comprising a first surface and a second surface opposite to said first surface, having a coating applied to, and substantially covering at least one of said first and second surfaces, characterized in that the elongation ratio of said coating to said water-soluble substrate is at least 1.

The present invention also relates to an articles comprising the water-soluble substrate, and to a method of making the water-soluble substrate.

DETAILED DESCRIPTION OF THE INVENTION

This invention relates to a water-soluble substrate, and more particularly a water-soluble substrate which has improved resistance dissolution prior to being immersed in water, and methods of making the same. This invention also relates to articles comprising the water-soluble substrate described herein.

Water-Soluble Substrate

Figure 1:
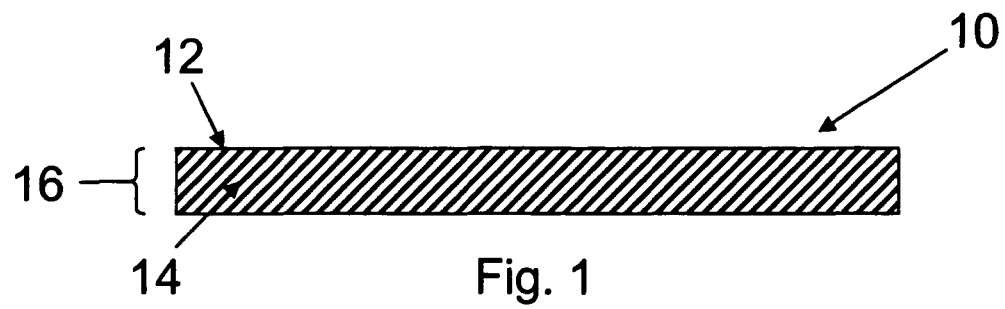
FIG. 1 shows a cross-section of a non-coated water-soluble substrate.

FIG. 1 shows a cross-section of a water-soluble substrate 10. The water-soluble substrate 10 has a first surface 12, a second surface 14 opposite to the first surface 12, and a thickness 16 between the first surface 12 and the second surface 14. The water-soluble substrate 10 can be in the form of a film, a sheet, or a foam, and includes woven and nonwoven structures.

The water-soluble substrate is made of polymeric materials and has a water-solubility of at least 50 weight %, as measured by the method set out here after using a glass-filter with a maximum pore size of 20 microns. Preferably, the water-solubility of the substrate is at least 75 weight % or even more preferably at least 95 weight %.

50 grams±0.1 gram of substrate material is added in a pre-weighed 400 ml beaker and 245 ml±1 ml of 25° C. distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved fraction). Then, the % solubility can be calculated.

Typically the water-soluble substrate 10 has a basis weight of from 0.33 to 1,667 grams per square meter, preferably from 33 to 167 grams per square meter. The thickness of the water-soluble substrate 10 between the first surface 12 and the second surface 14 can range from about 0.75 micrometer to about 1,250 micrometer, preferably from about 10 micrometer to about 250 micrometer, more preferably from about 25 micrometer to about 125 micrometer.

Preferred polymers, copolymers or derivatives thereof suitable for use as substrate material are selected from polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof. The most preferred polymer is polyvinyl alcohol. Preferably, the level of polymer in the substrate is at least 60%.

An example of commercially available water-soluble films are PVA films known under the trade reference Monosol M8630, as sold by Chris-Craft Industrial Products of Gary, Ind., US, and PVA films of corresponding solubility and deformability characteristics. Other films suitable for use herein include films known under the trade reference PT film or the K-series of films supplied by Aicello, or VF-HP film supplied by Kuraray.

Coating

Figure 2:
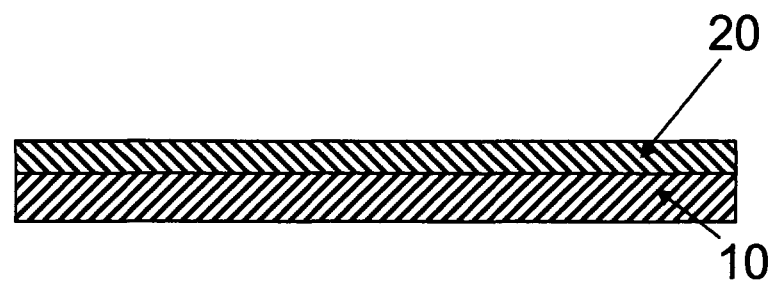
FIG. 2 shows a cross-section of one embodiment of a water-soluble substrate according to the present invention.

As shown in FIG. 2, a coating 20 is applied to and substantially covers at least one of the first or second surfaces 12, 14 of the water-soluble substrate 10. With "substantially covers", it is meant that at least 95%, preferably at least 99%, and most preferably 100% of the first or second surface 12, 14 is covered by the coating. This ensures that upon accidental water-contact, the water will either not be able to reach the first or second surface 12, 14 of the water-soluble substrate 10, or the amount of water that reaches said surface, is not enough to completely solubilise the water-soluble substrate 10.

The elongation ratio of the coating 20 to the water-soluble substrate 10 is at least 1, preferably higher than 1, even more preferably from 1 to 10, most preferably from 1.5 to 5. The elongation of a material is defined as the percentage it can be stretched in one direction under a constant force without breaking. Elongation can be measured according to ASTM standard D 882-02. As such, an elongation ratio between the coating 20 and the water-soluble substrate 10 of at least 1, means that the coating 20 can be stretched as much as the water-soluble substrate 10, without breaking such that water can not reach the surface of the water-soluble substrate 10.

The coating 20 preferably comprises a material which is less water-soluble than the water-soluble substrate, more preferably comprises a material which is water-insoluble. With "water-insoluble material", it is meant that the solubility is less than 50 weight %, as measured according to the previously described method. Preferably the water-solubility is less than 40 weight %, more preferably less than 30 weight %, and most preferably less than 10 weight %.

Preferred coatings are coatings which can be elongated at least 20%, more preferably at least 30%, even more preferably at least 50%, even more preferably more than 100% and most preferably more than 200%, without breaking. Examples of such coatings are liquid polyurethane coatings sold by Ideal Products LLC (Plymouth, Ind.) under the tradename of Sani-Tred Permaflex™, or by HMG America LLC (Performance Coatings, Roebuck, S.C.) under the tradename Flexithane™. Other examples of such coatings are the acrylic-based dip coatings which are flexible at low temperatures, sold by JC Whitney Inc. (Chicago, Ill.). Highly preferred coatings for use in the present invention are the coating coded SOP 00090 supplied by ANI Printing Inks Group (Plymouth, Minn., USA), and the latex based coating Krilon H2O brand supplied by Krilon Products Group (Cleveland, Ohio, USA). Other examples are coatings comprising flakes or particulates of a non-flexible or non-elastic material, mixed with a lubricant or slip agent. This lubricant or slip agent ensures that, upon stretching of the water-soluble substrate, the flakes or particulates can slide over one another. Preferred lubricants include, but are not limited thereto, talc, polytetrafluoroethylene (PTFE), cornstarch, silicone, wax, oil, polyolefins such as polyethylene, polypropylene, or combinations thereof.

The coating 20 can be applied in any suitable amount. Preferably, the coating is applied in an amount of at least 0.1 parts, more preferably at least 1 part, even more preferably at least 10 parts, per 100 parts by weight of the water-soluble substrate. Preferably, the amount of coating applied to said water-soluble substrate 10 ranges from at least 0.1 to 200, more preferably from 1 to 150, even more preferably from 1 to 100, even more preferably from 10 to 80 parts, per 100 parts by weight of the water-soluble substrate 10.

The coatings according to the present invention are preferably colored coatings in order to create visually appealing effects, such as graphics, cartoons, logo's, branding, user's instructions, and the like.

Optional Ingredients

It may be required for certain applications that the dissolution rate (when immersed) of the substrate is increased. Disintegrants may be added to the coating in order to speed up the dissolution when the water-soluble substrate is immersed in water. Preferably, the level of disintegrant in the coating is from 0.1 to 30%, preferably from 1 to 15%, by weight of said coating. Alternatively, disintegrants may also be applied on the surface of the water-soluble substrate 10, opposite to the surface onto which the coating is applied, or they may be applied onto both surfaces of the water-soluble substrate 10, or they may be integrated into the water-soluble film 10, or any combination thereof. Suitable disintegrants for use herein are corn/potato starch, methyl cellulose/celluloses, mineral clay powders, croscarmelose (cross-linked cellulose), crospovidine (cross-linked polymer), sodium starch glycolate (cross-linked starch).

The water-soluble substrate-forming composition and the water-soluble substrate 10 formed therefrom can also comprise one or more additive or adjunct ingredients. For example, the water-soluble substrate-forming composition and the water-soluble substrate 10 may contain: plasticizers, lubricants, release agents, fillers, extenders, anti-blocking agents, de-tackifying agents, antifoams, or other functional ingredients. The latter may, in the case of articles containing compositions for washing, include, but are not limited to functional detergent additives to be delivered to the wash water, for example organic polymeric dispersants, or other detergent additives.

The water-soluble substrate 10, as noted above, may comprise a plasticizer. Suitable plasticizers include, but are not limited to: glycerol, glycerin, diglycerin, hydroxypropyl glycerine, sorbitol, ethylene glycol, diethylene glycol, triethylene glycol, tetraethylene glycol, propylene glycol, polyethylene glycols, neopentyl glycol, trimethylolpropane, polyether polyols, ethanolamines, and mixtures thereof. The plasticizer can be incorporated in the water-soluble substrate 10 in any suitable amount including amounts in the range of from about 5% to about 30% by weight, preferably in the range of from about 12% to about 20% by weight.

Suitable surfactants may include the nonionic, cationic, anionic and zwitterionic classes. Suitable surfactants include, but are not limited to, polyoxyethylenated polyoxypropylene glycols, alcohol ethoxylates, alkylphenol ethoxylates, tertiary acetylenic glycols and alkanolamides (nonionics), polyoxyethylenated amines, quaternary ammonium salts and quaternized polyoxyethylenated amines (cationics), and amine oxides, N-alkylbetaines and sulfobetaines (zwitterionics). The surfactant can be incorporated in the water-soluble substrate 10 in any suitable amount including amounts in the range of from about 0.01% to about 1% by weight, preferably in the range of from about 0.1% to about 0.6% by weight.

Suitable lubricants/release agents include, but are not limited to, fatty acids and their salts, fatty alcohols, fatty esters, fatty amines, fatty amine acetates and fatty amides. The lubricant/release agent can be incorporated in the water-soluble substrate 10 in any suitable amount including amounts within the range of from about 0.02% to about 1.5% by weight, preferably in the range of from about 0.04% to about 0.15% by weight.

Suitable fillers, extenders, antiblocking agents, detackifying agents include, but are not limited to: starches, modified starches, crosslinked polyvinylpyrrolidone, crosslinked cellulose, microcrystalline cellulose, silica, metallic oxides, calcium carbonate, talc and mica. The filler, extender, antiblocking agent, detackifying agent can be present in the water-soluble substrate 10 in any suitable amount including to amounts in the range of from about 0.1% to about 25% by weight, preferably in the range of from about 1% to about 15% by weight. In the absence of starch, it may be desirable for the filler, extender, antiblocking agent, detackifying agent to be present in a range of from about 1% to about 5% by weight.

Suitable antifoams include, but are not limited to, those based on polydimethylsiloxanes and hydrocarbon blends. The antifoam can be present in the water-soluble substrate 10 in any suitable amount including amounts in the range of from about 0.001% to about 0.5%, or in the range of from about 0.01% to about 0.1% by weight.

The composition is prepared by mixing the materials and agitating the mixture while raising the temperature from about 70° F. (about 21° C.) to 195° F. (about 90° C.) until solution is complete. The substrate-forming composition may be made into any suitable form (e.g. film or sheets) and may then be subsequently formed into any suitable product (e.g. single- and multiple-compartment pouches, sachets, bags, etc.).

Methods of Making a Water-Soluble Substrate

There are numerous non-limiting embodiments of the method of making the water-soluble substrate 10 described herein.

In one embodiment, the method comprises providing a previously formed water-soluble substrate 10 and applying a coating 20 to at least one of the surfaces 12, 14 of the previously formed water-soluble substrate 10.

The coating 20 can be applied to the previously formed water-soluble substrate 10 in a number of different manners. In one non-limiting embodiment, the coating 20 is applied to at least one of the surfaces 12, 14 of the previously formed water-soluble substrate 10 in the form of particles. One example of particles is rubber beads, which stick together after they have been applied to the surface of the water-soluble substrate 10. Preferably, the particles are applied to the water-soluble substrate 10 via a jet, or electro-statically. Due to the high speed of the jet, some of the particles are embedded into the substrate, thereby reducing, or even eliminating the need for using a binder. Also when the powder is applied electro-statically, a binder is generally not needed. Nevertheless, a binder may be used. The binder may first be applied to the water-soluble substrate 10, before the particles are applied. Or, alternatively, the binder may be mixed with the particles, and then the mixture is added to the water-soluble substrate 10.

In another non-limiting embodiment of the method, the coating 20 is provided in the form of a solution that is applied onto at least one of the surfaces 12, 14 of the water-soluble substrate 10, and is allowed to dry, or undergoes a drying process. The solution can be applied on the substrate by means of any coating process, including spray, knife, rod, kiss, slot, painting, printing and mixtures thereof. Printing is preferred for use herein. Printing is a well established and economic process. Printing is usually done with inks and dyes and used to impart patterns and colours to substrates but in the case of the invention printing is used to deposit the coating onto a water-soluble substrate. Any kind of printing method can be used, including rotogravure, lithography, flexography, porous and screen printing, inkjet printing, letterpress, tampography and combinations thereof. In a highly preferred embodiment, the coating is applied in several layers. A first coating layer is applied to the water-soluble substrate 10, and is then allowed to dry. Consequently, one or more additional coating layers may be added until the desired coating thickness is obtained. As such, thin water-soluble substrate can be used, yet made resistant to accidental water contact.

These embodiments may also comprise a step of wetting at least a portion of at least one of the surfaces 12, 14 of the water-soluble substrate 10 prior to applying the coating 20 to the previously formed water-soluble substrate 10. The wetting of at least one of the surfaces 12, 14 of the water-soluble substrate 10 may be used to at least partially dissolve or solubilize an outer portion of the surface 12, 14 of the substrate 10 (that is, part of the way into the thickness of the substrate). The water-soluble substrate 10 may be at least partially solubilized to any suitable depth in order to partially embed the coating into the substrate. Suitable depths include, but are not limited to: from about 1% to about 40% or about 45%, from about 1% to about 30%, from about 1% to about 20%, from about 1% to about 15%, and alternatively, from about 1% to about 10% of the overall substrate thickness 16. The coating 20 is then applied to the partially dissolved portion of at least one of the surfaces 12, 14 of the substrate 10. This allows the coating 20 to be embedded into an outer portion of the surface 12, 14 of the substrate 10, and to become a more permanent part of the substrate 10. The wetted surface 12, 14 of the substrate 10 with the coating 20 embedded into the same is then permitted to dry. Such an embodiment of the method may also comprise a step of removing at least some of any loose or excess of coating 20 remaining on the surface of the water-soluble substrate 10 after it has dried, such as by wiping or dusting the surface of the substrate 10.

In another embodiment, the coating 20 can be added to the water-soluble substrate 10 after the substrate 10 is made into a product. For example, if the water-soluble substrate 10 is used to form a water-soluble pouch that contains a composition, the coating 20 can be added to the substrate 10 on at least a portion of the surface of the water-soluble pouch.

Methods of Making a Water-Soluble Pouch

The water-soluble substrate 10 described herein can be formed into articles, including but not limited to those in which the water-soluble substrate 10 is used as a packaging material. Such articles include, but are not limited to water-soluble pouches, sachets, and other containers.

Water-soluble pouches and other such containers that incorporate the water-soluble substrate 10 described herein can be made in any suitable manner known in the art. The water-soluble substrate 10 can be provided with improved resistance to solubility either before or after forming the same into the final product. In either case, in certain embodiments it is desirable when making such articles, that the surface 12, 14 of the substrate 10 on which the coating is applied, forms an outer surface of the product.

There are a number of processes for making water-soluble pouches. These include, but are not limited to processes known in the art as: vertical form-fill-sealing processes, horizontal form-fill sealing processes, and formation of the pouches in molds on the surface of a circular drum. In vertical form-fill-sealing processes, a vertical tube is formed by folding a substrate. The bottom end of the tube is sealed to form an open pouch. This pouch is partially filled allowing a head space. The top part of the open pouch is then subsequently sealed together to close the pouch, and to form the next open pouch. The first pouch is subsequently cut and the process is repeated. The pouches formed in such a way usually have pillow shape. Horizontal form-fill sealing processes use a die having a series of molds therein. In horizontal form-fill sealing processes, a substrate is placed in the die and open pouches are formed in these molds, which can then be filled, covered with another layer of substrate, and sealed. In the third process (formation of pouches in molds on the surface of a circular drum), a substrate is circulated over the drum and pockets are formed, which pass under a filling machine to fill the open pockets. The filling and sealing takes place at the highest point (top) of the circle described by the drum, e.g. typically, filling is done just before the rotating drum starts the downwards circular motion, and sealing just after the drum starts its downwards motion.

In any of the processes that involve a step of forming of open pouches, the substrate can initially be molded or formed into the shape of an open pouch using thermoforming, vacuum-forming, or both. Thermoforming involves heating the molds and/or the substrate by applying heat in any known way such as contacting the molds with a heating element, or by blowing hot air or using heating lamps to heat the molds and/or the substrate. In the case of vacuum-forming, vacuum assistance is employed to help drive the substrate into the mold. In other embodiments, the two techniques can be combined to form pouches, for example, the substrate can be formed into open pouches by vacuum-forming, and heat can be provided to facilitate the process. The open pouches are then filled with the composition to be contained therein.

The filled, open pouches are then closed, which can be done by any method. In some cases, such as in horizontal pouch-forming processes, the closing is done by continuously feeding a second material or substrate, such as a water-soluble substrate, over and onto the web of open pouches and then sealing the first substrate and second substrate together. The second material or substrate can comprise the water-soluble substrate 10 described herein. It may be desirable for the surface of the second substrate onto which the coating is applied, to be oriented so that it forms an outer surface of the pouch.

In such a process, the first and second substrates are typically sealed in the area between the molds, and, thus, between the pouches that are being formed in adjacent molds. The sealing can be done by any method. Methods of sealing include heat sealing, solvent welding, and solvent or wet sealing. The sealed webs of pouches can then be cut by a cutting device, which cuts the pouches in the web from one another, into separate pouches. Processes of forming water-soluble pouches are further described in U.S. patent application Ser. No. 09/994,533, Publication No. US 2002/0169092 A1, published in the name of Catlin, et al.

Articles of Manufacture

Figure 3:
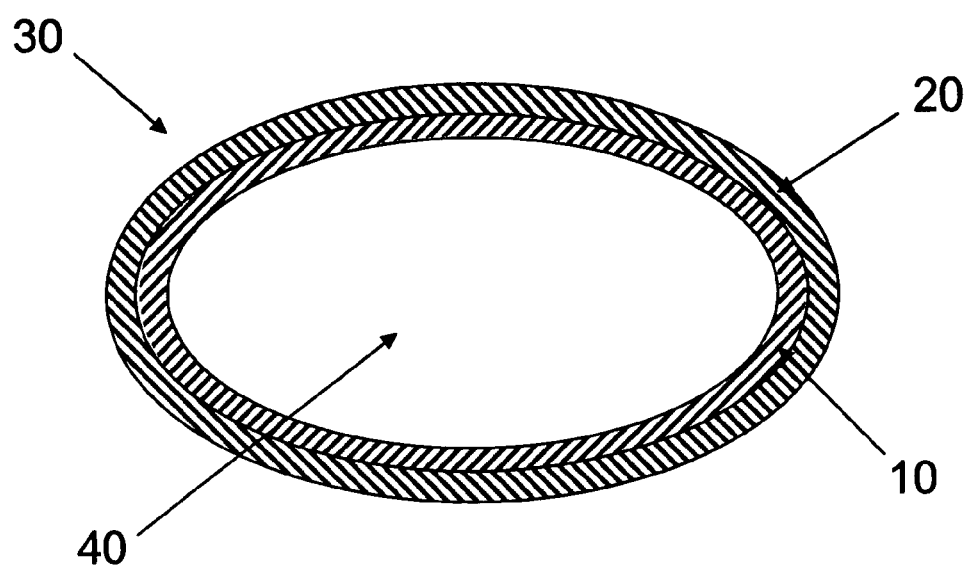
FIG. 3 shows a cross-section of an article comprising a water-soluble substrate according to the present invention.

As shown in FIG. 3, the present invention also includes articles comprising a product composition 40 and a water-soluble substrate 10, which may be formed into a container 30, such as a pouch, a sachet, a capsule, a bag, etc. to hold the product composition. The surface of the water-soluble substrate 10 which has the coating 20 applied thereto, may be used to form an outside surface of the container 30. The water-soluble substrate 10 may form at least a portion of a container 30 that provides a unit dose of the product composition 40.

For simplicity, the articles of interest herein will be described in terms of water-soluble pouches, although it should be understood that discussion herein also applies to other types of containers.

The pouches 30 formed by the foregoing methods, can be of any form and shape which is suitable to hold the composition 40 contained therein, until it is desired to release the composition 40 from the water-soluble pouch 30, such as by immersion of the water-soluble pouch 30 in water. The pouches 30 can comprise one compartment, or two or more compartments (that is, the pouches can be multi-compartment pouches). In one embodiment, the water-soluble pouch 30 may have two or more compartments that are in a generally superposed relationship and the pouch 30 comprises upper and lower generally opposing outer walls, skirt-like side walls, forming the sides of the pouch 30, and one or more internal partitioning walls, separating different compartments from one another. If the composition 40 contained in the pouches 30 comprises different forms or components, the different components of the composition 40 may be contained in different compartments of the water-soluble pouch 30 and may be separated from one another by a barrier of water-soluble material.

The pouches or other containers 30 may contain a unit dose of one or more composition 40 for use as/in laundry detergent compositions, automatic dishwashing detergent compositions, hard surface cleaners, stain removers, fabric enhancers and/or fabric softeners, food and beverage and new product forms where contact with small amounts of water could create premature pouch dissolution, unwanted pouch leakage and/or undesirable pouch-to-pouch stickiness. The compositions 40 in the pouches 30 can be in any suitable form including, but not limited to: liquids, liquigels, gels, pastes, creams, solids, granules, powders, etc. The different compartments of multi-compartment pouches 30 may be used to separate incompatible ingredients. For example, it may be desirable to separate bleaches and enzymes into separate compartments. Other forms of multi-compartment embodiments may include a powder-containing compartment in combination with a liquid-containing compartment. Additional examples of multiple compartment water-soluble pouches are disclosed in U.S. Pat. No. 6,670,314 B2, Smith, et al.

The water-soluble pouches 30 may be dropped into any suitable aqueous solution (such as hot or cold water), whereupon water-soluble substrate 10 forming the water-soluble pouches 30 dissolves to release the contents of the pouches.

The water-soluble substrate 10 described herein can also be used for coating products and other articles. Non-limiting examples of such a product are laundry detergent tablets or automatic dishwashing detergent tablets. Other examples include coating products in the food and beverage category where contact with small amounts of water could create premature dissolution, unwanted leakage and/or undesirable stickiness.

EXAMPLES

A flexible coating coded SOP 00090, supplied by ANI Printing Inks Group, is printed onto a standard PvOH M8630 soluble film supplied by Monosol. The following method is used to measure the water resistance of the coated film vs. uncoated film.

To determine if a film is resistant to accidental water contact a proplet Test method is used. In this test, a pouch (approx. 2"×2") is formed in a cavity and a droplet of 0.2 ml of room temperature water is added to the formed side of the pouch. The formed side is the stressed case for this test since the film is thinned during cavity formation. A stopwatch is started as soon as the water contacts the pouch and the time when significant film deformation in the body of the pouch is observed is recorded. This time, termed "Time to Deform" is a precursor to film failure.

Results

| Material | Time to Deform |
| --- | --- |
| Uncoated M8630 film by Monosol, 3 mil thickness | Immediate (1 sec) |
| M8630 coated with SOP00090 flexible coating | No deformation |

Latex based coating (Krilon H2O brand supplied by Krilon Products Group, Cleveland Ohio) is sprayed onto the standard PvOH M8630 soluble film supplied by Monosol.

Results

| Material | Time to Deform |
| --- | --- |
| Uncoated M8630 film by Monosol, 3 mil thickness | Immediate (1 sec) |
| M8630 coated with Latex coating | No deformation |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article comprising a water-soluble substrate:
  a. made of polymeric materials selected from the group consisting of polyvinyl alcohol (PVA), polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids, polyamides, polyacrylamide, copolymers of maleic/acrylic acids, polysaccharides, natural gums, polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, polyvinyl alcohol copolymers, hydroxypropyl methyl cellulose (HPMC), and mixtures thereof; and
  b. comprising a first surface and a second surface opposite to said first surface, said first surface forming an outside surface of said article and wherein at least a portion of said first surface is wetted and; and
  c. having a water-solubility of at least 50 weight %;
  wherein a coating having a solubility less than 50 weight % is applied as a solution to said first surface, such that said coating covers at least 95% of said first surface; wherein the elongation ratio of said coating to said water-soluble substrate is from about 1 to 10; and further wherein the water-soluble substrate has a thickness between the first surface and the second surface of from about 10 micrometers to about 250 micrometers; and wherein the article is in the form of a multi-compartment water-soluble pouch that substantially dissolves in water.

2. A water-soluble substrate according to claim 1, wherein said elongation ratio is from about 1.5 to about 5.

3. A water-soluble substrate according to claim 1, wherein said coating is applied to said first and said second surfaces.

4. An article according to claim 1, wherein the coating is applied in an amount of at least 0.1 parts by weight of the water-soluble substrate.

5. An article according to claim 1, wherein the water-soluble substrate is partially solubilized.

6. An article according to claim 1, wherein the water-soluble substrate is solubilized to a depth of from about 1% to about 45% of the overall water-soluble substrate thickness.

* * * * *